United States Patent
Lee et al.

(10) Patent No.: US 10,042,061 B2
(45) Date of Patent: Aug. 7, 2018

(54) RADIATION DETECTOR AND METHOD OF OPERATING THE SAME

(71) Applicant: Samsung Electronics Co., Ltd., Suwon-si, Gyeonggi-do (KR)

(72) Inventors: Dongwook Lee, Suwon-si (KR); Kangho Lee, Osan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 411 days.

(21) Appl. No.: 14/819,522

(22) Filed: Aug. 6, 2015

(65) Prior Publication Data
US 2016/0041275 A1     Feb. 11, 2016

(30) Foreign Application Priority Data

Aug. 6, 2014  (KR) .......................... 10-2014-0101100

(51) Int. Cl.
  G01T 1/26     (2006.01)
  G01T 1/24     (2006.01)
(52) U.S. Cl.
  CPC ..................................... G01T 1/24 (2013.01)
(58) Field of Classification Search
  CPC .................................................. G01T 1/24
  USPC ........................................................ 250/371
  See application file for complete search history.

(56) References Cited

U.S. PATENT DOCUMENTS

| | | | |
|---|---|---|---|
| 4,893,904 A * | 1/1990 | Ohta | G02F 1/13306 349/161 |
| 5,341,409 A | 8/1994 | Conrads et al. | |
| 5,563,421 A * | 10/1996 | Lee | G01T 1/24 250/370.09 |
| 2012/0181440 A1* | 7/2012 | Kim | H01L 51/441 250/370.01 |
| 2013/0108019 A1 | 5/2013 | Tkaczyk et al. | |
| 2014/0284456 A1* | 9/2014 | Okada | G01J 1/42 250/208.2 |
| 2015/0168569 A1 | 6/2015 | Hackenschmied et al. | |

FOREIGN PATENT DOCUMENTS

| | | |
|---|---|---|
| JP | 2011515857 A | 5/2011 |
| KR | 20030031924 A | 4/2003 |
| KR | 20120001991 A | 1/2012 |
| KR | 20120030699 A | 3/2012 |
| WO | WO 2014/019821 | 2/2014 |

OTHER PUBLICATIONS

Extended European Search Report issued for EP 15179681.0 dated Jan. 5, 2016, 12 pgs.
Zhao et al., "Performance Evaluation of Polycrystalline HgI2 Photoconductors for Radiation Therapy Imaging", Medical Physics, 37 (6), Jun. 2010, pp. 2738-27485.

* cited by examiner

Primary Examiner — David Porta
Assistant Examiner — Meenakshi Sahu

(57) ABSTRACT

A radiation detector and a method of operating the radiation detector. The radiation detector includes: a photoconductive layer between the array substrate and the counter electrode and having a particle-in-binder (PIB) structure in which a photoconductive particle and a binder are mixed; and an optical unit for providing light energy to the photoconductive layer to detrap a charge trapped in an interface between the photoconductive particle and the binder. The light energy includes ultraviolet rays and/or visible rays.

24 Claims, 21 Drawing Sheets

RADIATION DETECTOR AND METHOD OF OPERATING THE SAME

RELATED APPLICATION

This application claims the benefit of priority from Korean Patent Application No. 10-2014-0101100, filed on Aug. 6, 2014, in the Korean Intellectual Property Office, the disclosure of which is incorporated herein in its entirety by reference.

BACKGROUND

1. Field

Example embodiments relate to radiation detectors and methods of operating the same.

2. Description of the Related Art

Radiation such as X-ray and gamma (γ)-ray may be used to probe the inside of an object owing to a high penetrability of the radiation. Thus, the radiation is usually used for a medical field and a non-destructive test. A penetration amount of the radiation may vary according to the density of the inside of the object. A difference in the penetration amount may be measured to form an image of the inside of the object.

To detect the difference in the penetration amount, a photoconductor, i.e., a photoelectric conversion material, may be used. If the radiation is radiated onto the photoconductor, an electron-hole pair may be generated inside the photoconductor and may be separated into an electron and a hole and converted into an electrical signal. According to an amount (intensity) of the radiation injected into the photoconductor through the object, an amount of charges generated in the photoconductor may vary. Such a difference in the amount of charges may be used to form the image of the inside of the object.

SUMMARY

Example embodiments relate to radiation detectors for removing charges trapped in a photoconductor formed of heterogeneous materials.

Example embodiments relate to methods of removing (i.e. initializing) charges trapped in a photoconductor, which is performed by radiation detectors for removing the charges trapped in the photoconductor formed of heterogeneous materials.

Example embodiments relate to radiation detectors and methods for removing charges trapped in a photoconductor having a particle-in-binder (PIB) structure.

Additional example embodiments will be set forth in part in the description which follows and, in part, will be apparent from the description, or may be learned by practice of the example embodiments.

According to at least one example embodiment, a radiation detector includes an array substrate including a plurality of pixel electrodes; a counter electrode facing the array substrate; a photoconductive layer between the array substrate and the counter electrode and having a particle-in-binder (PIB) structure in which a photoconductive particle and a binder are mixed; and an optical unit configured to provide light energy to the photoconductive layer to detrap a charge trapped in an interface between the photoconductive particle and the binder.

The light energy may include ultraviolet rays.

The light energy may include ultraviolet rays and visible rays.

The optical unit may include an ultraviolet light source configured to generate ultraviolet rays as the light energy; and an optical waveguide configured to guide the ultraviolet rays generated by the ultraviolet light source to the photoconductive layer.

The radiation detector further may include a light shutter provided between the optical unit and the photoconductive layer, wherein the light shutter is configured to control an amount of the ultraviolet rays incident onto the photoconductive layer.

The light shutter may include a liquid crystal layer.

The optical unit may include: a visible light source configured to generate visible rays as the light energy; and an optical waveguide configured to guide the visible rays generated by the visible light source to the photoconductive layer.

The visible light source may include a light emitting diode (LED).

The light energy may include light having a wavelength in a range of about 200 nm~about 400 nm.

The light energy may include light having a wavelength in a range of about 400 nm~about 800 nm.

The optical unit may be configured to detrap at least one of charges trapped in the photoconductive particle by using the light energy.

The photoconductive particle may include at least one of $HgI_2$, $PbI_2$, PbO, TlBr, CdTe, CdZnTe, CdS, $BiI_3$ and mixtures thereof.

The photoconductive particle may include $HgI_2$.

The binder may include at least one of a polyvinyl butyral based material, an acryl based material, a polyester based material, a phenoxy based material, a polyvinyl formal based material, a polyamide based material, a polystyrene based material, a polycarbonate based material, a polyvinyl acetate based material, a polyurethane based material, an epoxy based material and mixtures thereof.

The optical unit may be on a lower surface of the array substrate, wherein the array substrate is between the optical unit and the photoconductive layer.

The optical unit may be on the counter electrode, wherein the counter electrode is between the optical unit and the photoconductive layer.

The photoconductive layer may have a thickness in a range of about 100~about 250 μm.

The array substrate may include a plurality of thin film transistor (TFT) devices respectively connected to the plurality of pixel electrodes.

The radiation detector may be an X-ray detector or a gamma (γ)-ray detector.

According to another example embodiment, a method of operating a radiation detector having a photoconductive layer having a particle-in-binder (PIB) structure in which a photoconductive particle and a binder are mixed, the method includes: detecting radiation by using the radiation detector; and providing light energy to the photoconductive layer to detrap a charge trapped in an interface between the photoconductive particle and the binder when the radiation is detected.

The providing of the light energy to the photoconductive layer may include irradiating ultraviolet rays to the photoconductive layer.

The providing of the light energy to the photoconductive layer may include irradiating at least one of ultraviolet rays and visible rays to the photoconductive layer.

The method of operating a radiation detector further may include controlling an amount of the light energy provided to the photoconductive layer by using a light shutter included in the radiation detector.

The light energy may include light having a wavelength in a range of about 200 nm~about 400 nm.

The light energy may include light having a wavelength in a range of about 400 nm~about 800 nm.

The providing of the light energy to the photoconductive layer may include detrapping at least one of charges trapped in the photoconductive particle by using the light energy.

The photoconductive particle may include at least one of $HgI_2$, $PbI_2$, PbO, TlBr, CdTe, CdZnTe, CdS, $BiI_3$ and mixtures thereof.

The binder may include at least one of a polyvinyl butyral based material, an acryl based material, a polyester based material, a phenoxy based material, a polyvinyl formal based material, a polyamide based material, a polystyrene based material, a polycarbonate based material, a polyvinyl acetate based material, a polyurethane based material, an epoxy based material, and mixtures thereof.

The photoconductive layer may be between two electrodes, the method further may include providing the light energy to the photoconductive layer when no voltage is applied to the two electrodes.

The light energy may be incident onto the photoconductive layer in the opposite direction to which the radiation is incident onto the radiation detector.

The light energy is incident onto the photoconductive layer in the same direction as which the radiation is incident onto the radiation detector.

The radiation detector is an X-ray detector or a gamma ($\gamma$)-ray detector.

According to another example embodiment, a method of detrapping charges trapped in a radiation detector includes: irradiating a photoconductor including a particle-in-binder (PIB) structure with a first radiation, the first radiation creating electron/hole pairs, one or more of the electron/hole pairs being trapped; and irradiating the photoconductor with a second radiation, the second radiation substantially detrapping the one or more electron/hole pairs.

The method further may include at least one of: the first radiation comprises x-ray radiation; and the second radiation comprises one of ultraviolet radiation and visible radiation.

The particle-in-binder (PIB) structure may include a particle including at least one of $HgI_2$, $PbI_2$, PbO, TlBr, CdTe, CdZnTe, CdS, $BiI_3$ and mixtures thereof.

The particle-in-binder (PIB) structure may include a binder including at least one of a polyvinyl butyral based material, an acryl based material, a polyester based material, a phenoxy based material, a polyvinyl formal based material, a polyamide based material, a polystyrene based material, a polycarbonate based material, a polyvinyl acetate based material, a polyurethane based material, an epoxy based material, and mixtures thereof.

The first radiation may be irradiated from a first direction and the second radiation is irradiated from a second direction, the first direction being opposite to the second direction.

BRIEF DESCRIPTION OF THE DRAWINGS

These and/or other example embodiments will become apparent and more readily appreciated from the following description of the embodiments, taken in conjunction with the accompanying drawings in which.

DETAILED DESCRIPTION

Figure 1:
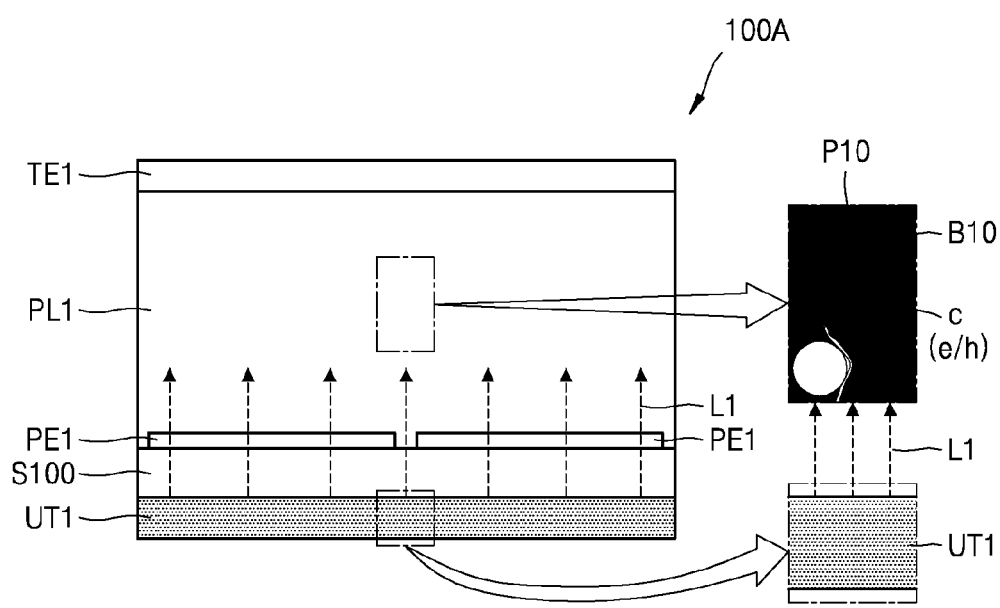
FIG. 1 is a cross-sectional view of a radiation detector, according to an example embodiment.

Various example embodiments will now be described more fully with reference to the accompanying drawings in which example embodiments are shown.

It will be understood that when an element is referred to as being "on," "connected" or "coupled" to another element, it can be directly on, directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Further, it will be understood that when a layer is referred to as being "under" another layer, it can be directly under or one or more intervening layers may also be present. In addition, it will also be understood that when a layer is referred to as being "between" two layers, it can be the only layer between the two layers, or one or more intervening layers may also be present.

It will be understood that, although the terms "first", "second", etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain example embodiments. As used herein, the term "and/or" includes any and all combinations of one or more of the associated listed items. Expressions such as "at least one of," when preceding a list of elements, modify the entire list of elements and do not modify the individual elements of the list.

In the drawing figures, the dimensions of layers and regions may be exaggerated for clarity of illustration. Like reference numerals refer to like elements throughout. The same reference numbers indicate the same components throughout the specification.

FIG. 1 is a cross-sectional view of a radiation detector 100A according to an example embodiment. The radiation detector 100A may be an X-ray detector or a gamma (γ)-ray detector.

Referring to FIG. 1, the radiation detector 100A according to an example embodiment may include an array substrate S100 including a plurality of pixel electrodes PE1 and a counter electrode TE1 spaced apart from the array substrate S100. The counter electrode TE1 may be a top electrode. The counter electrode TE1 may be facing the array substrate S100. The radiation detector 100A may include a photoconductor layer PL1 between the array substrate S100 and the counter electrode TE1. The photoconductor layer PL1 may be a "photoelectric conversion layer". The photoconductor layer PL1 may have a mixing structure of photoconductive particles P10 and a binder B10, i.e., a particle-in-binder (PIB) structure. The photoconductive particles P10 may provide a photoconduction characteristic, in other words, a photoelectric conversion characteristic. The binder B10 may provide adhesion by being mixed with the photoconductive particles P10. The binder B10 may facilitate a process of forming the photoconductor layer PL1. A paste including photoconductive powder, a binder material, a solvent, etc. is coated and thermally treated (dried), thereby forming the photoconductor layer PL1. When the photoconductor layer PL1 formed of a single material (a photoconductive material) is formed by depositing the single material without using a binder, it may not be easy to secure a thickness of the photoconductive layer. Thus, in view of the process of forming the photoconductor layer PL1 and securing the thickness, the photoconductor layer PL1 having a PIB structure may be advantageous. A thickness of the photoconductor layer PL1 may be in the range of about 100~about 250 μm, for example, about 120~about 180 μm.

The radiation detector 100A may include an optical unit UT1 that radiates light L1 onto the photoconductor layer PL1 for detrapping or removing charges c trapped in the photoconductor layer PL1. The trapped charges c may be electrons e or holes h. The optical unit UT1 may include at least one light source that generates the light L1. The optical unit UT1 may include an optical waveguide for transmitting the light L1. The optical waveguide may guide the light L1 generated by the light source to the photoconductor layer PL1. In this regard, the light L1 may be "light energy". The light L1 may be or include "electromagnetic waves". The light L1 may be or include a type of electromagnetic waves that is different than the radiation. In other words, the light L1 may be electromagnetic waves of a non-radiation region. As an example, the light L1 may include ultraviolet rays. Alternatively, the light L1 may include visible rays. Alternatively, the light L1 may include both ultraviolet rays and visible rays. The ultraviolet rays may have a wavelength in the range of about 200~about 400 nm, and an energy in the range of about 3.1~6.2 eV. The ultraviolet rays may have a wavelength in the range of about 220~about 380 nm, and an energy in the range of about 3.3~5.6 eV. The visible rays may have a wavelength in the range of about 400~about 800 nm, and an energy in the range of about 1.55~3.1 eV. When the light L1 includes ultraviolet rays, since the ultraviolet rays may have high energy, the light L1 may better detrap the trapped charges c than for other types of rays. When the light L1 includes both ultraviolet rays and visible rays, detrapping efficiency of the trapped charges c may be improved by using two types of light.

According to an example embodiment, the photoconductive particles P10 and the binder B10 included in the photoconductive layer PL1 having the PIB structure will now be described in more detail. The photoconductive particles P10 may include at least one of, for example, $HgI_2$, $PbI_2$, PbO, TlBr, CdTe, CdZnTe, CdS, $BiI_3$ and mixtures thereof. These materials may more easily absorb the radiation (the X-ray and the gamma ray) at a small thickness since they have a large amount of atoms and density, and may exhibit an excellent photoconductive characteristic since they has a low ionization energy by the radiation. In particular, $HgI_2$ may exhibit excellent photoconductive characteristic. However, the specific materials of the photoconductive particles P10 are examples, and other photoconductive materials may be used instead. The photoconductive particles P10 may have a globular shape or a shape closer to the globular shape. A shape of the photoconductive particles P10 may influence a characteristic (sensitivity, etc.) of the photoconductor layer PL1. When the photoconductive particles P10 have the globular shape or the shape closer to the globular shape, the characteristic (sensitivity, etc.) of the photoconductor layer PL1 may be improved.

The binder B10 provides adhesion by being mixed with the photoconductive particles P10. The binder B10 may include an organic polymer material. For example, the binder B10 may include at least one of a polyvinyl butyral based material, an acryl based material, a polyester based material, a phenoxy based material, a polyvinyl formal based material, a polyamide based material, a polystyrene based material, a polycarbonate based material, a polyvinyl acetate based material, a polyurethane based material, an epoxy based material, and mixtures thereof. A content ratio of the binder B10 with respect to a mixture of the photoconductive particles P10 and the binder B10 may be in the range of about 2.5 about 12 wt %. In other words, [{binder/(photoconductor particles+binder)}×100] may be in the range of about 2.5~about 12 wt %. The photoconductive layer PL1 may be formed through a low temperature (about lower than 150° C.) thermal treatment (dry) process, and thus the binder B10 may be maintained without being removed through heat treatment. A type and content ratio of the binder B10 may influence the characteristic (sensitivity, etc.) of the photoconductor layer PL1.

In addition, according to necessity, the photoconductor layer PL1 may further include a desired, or alternatively predetermined additive (not shown). The additive may include at least one of, for example, a dispersant, a defoamer, a leveling agent, etc. A content ratio of the additive with respect to the photoconductive particles P10, the binder B10, and the additive may be lower than about 3 wt %, for example, in the range of about 0.1~about 3 wt %.

When the photoconductor layer PL1 having the PIB structure is used as in the example embodiment, the charges c, i.e. the electrons e and the holes h, are trapped in an interface between the photoconductive particles P10 and the binder B10, which may cause noise in a detection signal (an image signal). That is, in the photoconductive layer PL1 formed of heterogeneous materials, the electrons e and the holes h may be trapped in an interface between the heterogeneous materials, and thus the trapped electrons e and holes h may cause the noise in the detection signal (image signal). The trapped electrons e and holes h may be factors that deteriorate photoelectric conversion efficiency of the photoconductive layer PL1. If radiation that transmits the object is incident on the photoconductive layer PL1, and generates the electrons e and the holes h in the photoconductive layer PL1, the electrons e and the holes h are moved to the pixel electrodes PE1 and the counter electrode TE1 and are converted into an electrical signal. When the photoconductive layer PL1 is formed of the heterogeneous materials, the electrons e and the holes h may be trapped in the interface between the heterogeneous materials. Although an electric field is generated in the photoconductive layer PL1 by applying voltages between the pixel electrodes PE1 and the counter electrode TE1, the electric field may not be uniform in the photoconductive layer PL1 due to a difference between the heterogeneous materials, and it may be difficult to move the electrons e and the holes h to the pixel electrodes PE1 and to the counter electrode TE1. The photoconductive layer PL1 has a relatively great thickness in the range of about 100~about 250 μm, and thus it may be difficult to apply a strong electric field to the trapped electrons e and the holes h. Thus, it may not be easy to remove the trapped electrons e and the holes h by using a method of applying voltages between the pixel electrodes PE1 and the counter electrode TE1. In the example embodiment, the electrons e and the holes h trapped between the heterogeneous materials of the photoconductive layer PL1 may be removed by providing a desired, or alternatively predetermined "light energy" to the photoconductive layer PL1 by using the optical unit UT1, i.e. by radiating the light L1. The light L1 may be substantially uniformly radiated throughout the photoconductive layer PL1 and may excite the trapped electrons e and the holes h at a relatively strong energy. Thus, the electrons e and the holes h may be detrapped by using the light L1, and may be moved to the pixel electrodes PE1 and to the counter electrode TE1. Therefore, the optical unit UT1 may be used to inhibit or prevent noise from being generated due to the trapped electrons e and the holes h, and allow the radiation detector 100A to have an excellent performance.

The optical unit UT1 may detrap electrons and holes trapped inside the photoconductive particles P10 by using the light L1 (i.e. light energy). The electrons e and the holes h generated in the photoconductive layer PL1 are partially trapped in the photoconductive particles P10 by irradiating the radiation. The electrons e and the holes h trapped in the photoconductive particles P10 may cause noise in the detection signal, and may reduce photoelectric conversion efficiency of the photoconductive layer PL1. An energy level of charges (the electrons e and the holes h) trapped in the photoconductive particles P10 may be in an energy bandgap of the photoconductive particles P10. If the light L1 is irradiated onto the photoconductive particles P10 from the optical unit UT1, the trapped electrons e may be excited to a conduction band. Meanwhile, the trapped holes h may be moved to a valence band. This may mean that the electrons e and the holes h trapped in the photoconductive particles P10 are detrapped. The detrapped electrons e and the holes h may be moved to the pixel electrodes PE1 and to the counter electrode TE1. Detrapping of the charges trapped in the photoconductive particles P10 will be described in detail with reference to FIG. 4 later.

The optical unit UT1 may recover a vacancy of a core electron of at least one of the photoconductive particles P10 by using the light L1 (i.e. light energy). If radiation is irradiated onto the photoconductive layer PL1, the core electron of at least one of the photoconductive particles P10 may be moved, and thus the vacancy of the core electron may be generated so that the photoconductive particles P10 may have positive (+) charges. The photoconductive particles P10 having the positive (+) charges may have difficulty in transferring and generating electrons when the radiation is applied. However, according to an example embodiment, the vacancy of the core electron may be filled with electrons of a valence band by the light L1 irradiated onto the photoconductive layer PL1. This is called a recovery or relaxation. The light L1 irradiated from the optical unit UT1 to the photoconductive layer PL1 may induce and facilitate the "recovery/relaxation", thereby improving photoelectric conversion efficiency of the photoconductive layer PL1. This will be described in more detail with reference to FIG. 5 later.

FIGS. 2A through 2D are cross-sectional views of the radiation detector 100A for explaining an example method of operating the radiation detector 100A according to an example embodiment. The radiation detector 100A of FIG. 1 is used in the example embodiment.

Figure 2A:
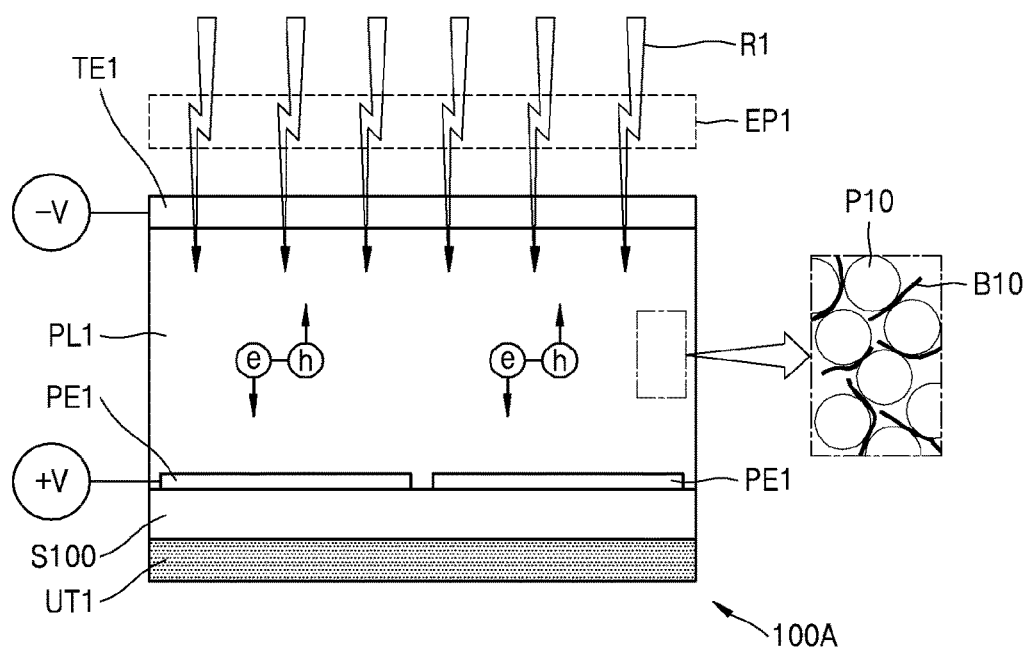
FIGS. 2A through 2D are cross-sectional views of a radiation detector for explaining a method of operating the radiation detector, according to an example embodiment.

Referring to FIG. 2A, the radiation detector 100A of FIG. 1 may detect radiation R1 that has been transmitted to and passed through an object EP1. When the radiation R1 is incident onto the photoconductive layer PL1, electron-hole pairs (e-h pair) may be generated in the photoconductive layer PL1, separated into electrons e and holes h, and moved to the pixel electrodes PE1 and to the counter electrode TE1, respectively. In this regard, a positive (+) voltage +V may be applied to the pixel electrodes PE1, and a negative (−) voltage −V may be applied to the counter electrode TE1. For convenience of description, although the positive (+) voltage +V is applied to only one of the pixel electrodes PE1, the positive (+) voltage +V may be applied to the pixel electrodes PE1. A charge (electron/hole) generation amount for each region may vary according to a penetration amount of the radiation R1. An inside of the object EP1 may be processed as an image based on differences in the charge (electron/hole) generation amount.

Figure 2B:
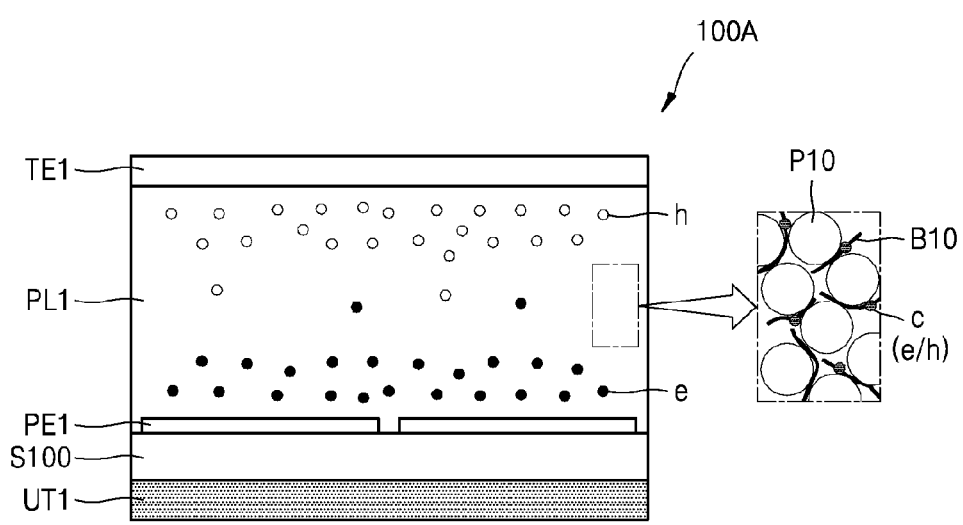

FIG. 2B shows an example of the electrons e and the holes h trapped in the photoconductive layer PL1 after irradiating and detecting the radiation R1 of FIG. 2A. In the example embodiment, the photoconductive layer PL1 having a PIB structure may be used to trap the electrons e and the holes h in an interface between the photoconductive particles P10 and the binder B10. The electrons may be trapped in the photoconductive particles P10 (not shown). Relatively more electrons e may be trapped in a part of the photoconductive layer PL1 that is closer to the pixel electrodes PE1, and relatively more holes h may be trapped in a part of the photoconductive layer PL1 that is closer to the counter electrode TE1. An enlarged view of a part of the photoconductive layer PL1 of FIG. 2B shows the trapped charges c. The trapped charges c may be the electrons e or the holes h.

Figure 2C:
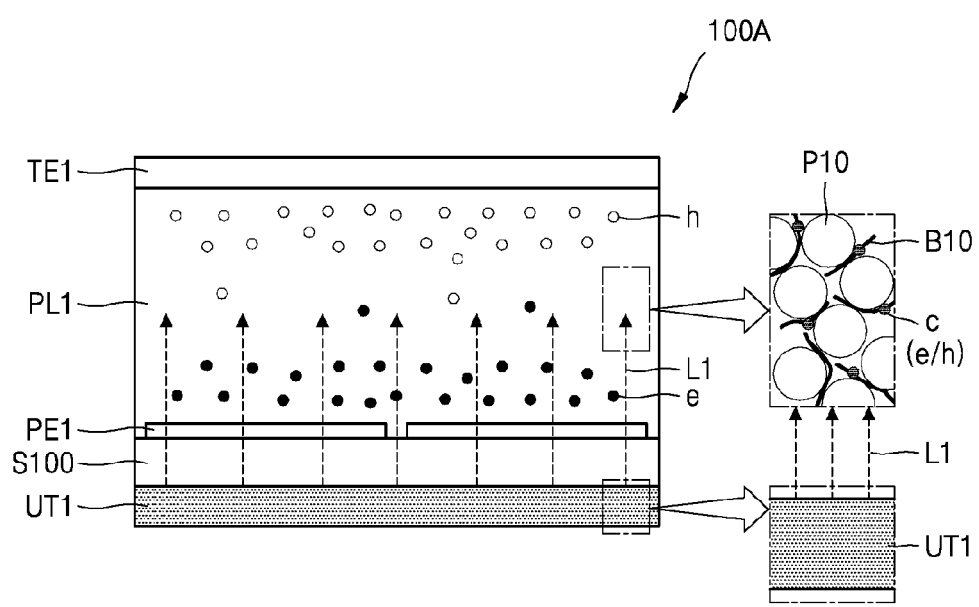

Referring to FIG. 2C, the optical unit UT1 may be used to irradiate the light L1 onto the photoconductive layer PL1. The light L1 may include ultraviolet rays. The light L1 may also include visible rays. The light L1 may include both ultraviolet rays and visible rays. The ultraviolet rays may have a wavelength in the range of about 200~about 400 nm, and energy in the range of about 3.1~6.2 eV. The ultraviolet rays may have a wavelength in the range of about 220~about 380 nm, and energy in the range of about 3.3~5.6 eV. The visible rays may have a wavelength in the range of about 400~about 800 nm, and energy in the range of about 1.55~3.1 eV. The electrons e and the holes h trapped between heterogeneous materials (particles/binder) of the photoconductive layer PL1 may be detrapped by irradiating the light L1 onto the photoconductive layer PL1 by using the optical unit UT1. The light L1 may be uniformly radiated throughout the photoconductive layer PL1 and may excite the trapped electrons e and the holes h at a relatively strong energy. Thus, the electrons e and the holes h may be detrapped by using the light L1, and may be moved to the pixel electrodes PE1 and to the counter electrode TE1. The charges c (electrons e/holes h) trapped in the photoconductive particles P10 may be detrapped by the light L1. When the light L1 includes ultraviolet rays, since the ultraviolet rays may have high energy, the light L1 may more favorably act to detrap the trapped charges c. When the light L1 includes both ultraviolet rays and visible rays, detrapping efficiency of the trapped charges c may be improved by using two types of light. An operation of FIG. 2C may be an "operation of initializing the photoconductive layer PL1". The expression "initializing" is for convenience of description and may not mean a complete reconstruction of the photoconductive layer PL1 to an initial state. The expression "initializing" may mean detrapping or removing the charges c trapped in the photoconductive layer PL1. The meaning of the expression "initializing" applies throughout the embodiments described herein.

Figure 2D:
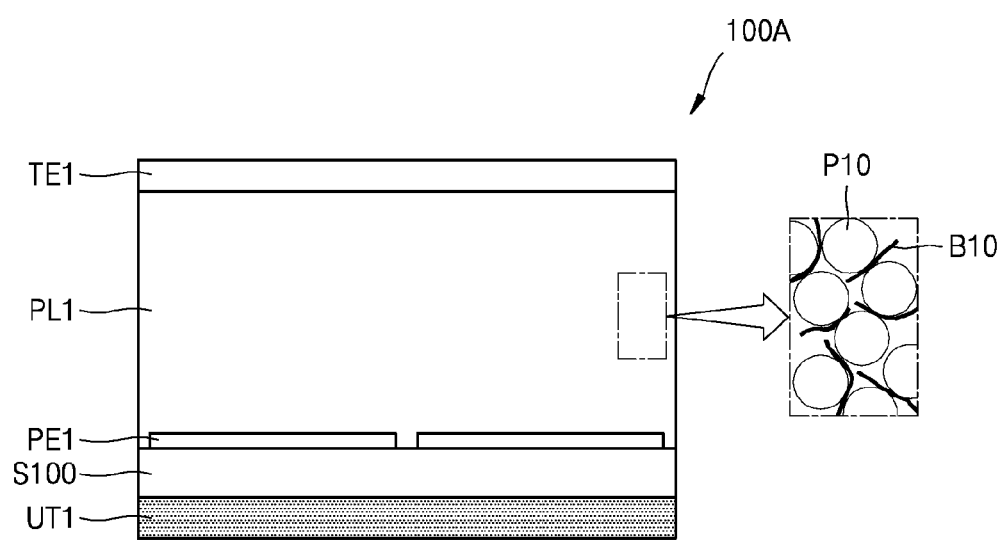

FIG. 2D shows a state where the electrons e and the holes h trapped in the photoconductive layer PL1 are removed through the operation (the operation of initializing the photoconductive layer PL1) of FIG. 2C. If the electrons e and the holes h trapped in the photoconductive layer PL1 are removed as described above, a characteristic of a following radiation detection process may be improved.

In the example embodiment, the "operation of initializing the photoconductive layer PL1" of FIG. 2C may be performed in a state where no voltage is applied to the pixel electrodes PE1 and to the counter electrode TE1. In other words, the charges c trapped in the photoconductive layer PL1 may be easily detrapped by not applying voltages to the pixel electrodes PE1 and the counter electrode TE1. In this case, the process may be simplified, and power consumption may be reduced. However, according to, the operation of example embodiments, initializing the photoconductive layer PL1 may be performed by applying a desired, or alternatively predetermined voltage to at least one of the pixel electrodes PE1 and the counter electrode TE1. For example, initializing the photoconductive layer PL1 may be performed by applying a desired, or alternatively predetermined negative (−) voltage to the pixel electrodes PE1 and a desired, or alternatively predetermined positive (+) voltage to the counter electrode TE1. In other words, initializing the photoconductive layer PL1 may be performed by applying a desired, or alternatively predetermined reverse voltage between the pixel electrodes PE1 and the counter electrode TE1. Alternatively, initializing the photoconductive layer PL1 may be performed by applying the desired, or alternatively predetermined positive (+) voltage to the pixel electrodes PE1 and the desired, or alternatively predetermined negative (−) voltage to the counter electrode TE1. Alternatively, the operation of FIG. 2C may be performed by not applying voltages to the pixel electrodes PE1 and the counter electrode TE1, and a desired, or alternatively predetermined voltage may be applied between the pixel electrodes PE1 and the counter electrode TE1 in a following operation. If the charges c are detrapped by the light L1 in the operation of FIG. 2C, a part of the detrapped charges c may be moved to the pixel electrodes PE1 and to the counter electrode TE1. If the desired, or alternatively predetermined voltage is applied between the pixel electrodes PE1 and the counter electrode TE1 in the following operation, the remaining detrapped charges c may be moved to the pixel electrodes PE1 and to the counter electrode TE1.

FIGS. 3A through 3D are diagrams for explaining a problem due to charges trapped in a photoconductive layer of a radiation detector according to an embodiment of the present disclosure.

Figure 3A:
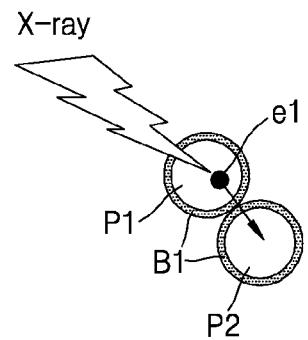
FIGS. 3A through 3D are diagrams for explaining a problem due to charges trapped in a photoconductive layer of a radiation detector, according to an example embodiment.

Referring to FIG. 3A, a PIB structure of a mixture of photoconductive particles P1 and P2 and a binder B1 may be provided. The PIB structure may correspond to a structure of the photoconductive layer PL1 of FIG. 1. For convenience of description, the photoconductive particles P1 and P2 are respectively "a first photoconductive particle P1" and "a second photoconductive particle P2". If a radiation such as, for example, an X-ray, is irradiated onto the PIB structure, an electron e1 may be moved from the first photoconductive particle P1 to the second photoconductive particle P2. A result may be shown in FIG. 3B.

Figure 3B:
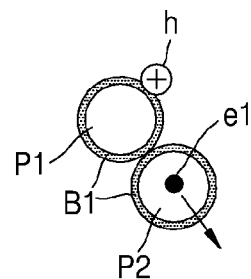

Referring to FIG. 3B, the hole h may be trapped in the photoconductive particle P1 as a result of the irradiation of the PIB structure. The electron e1 of the second photoconductive particle P2 may be moved to another adjacent photoconductive particle (not shown). Accordingly, the electron e1 may be serially moved.

Figure 3C:
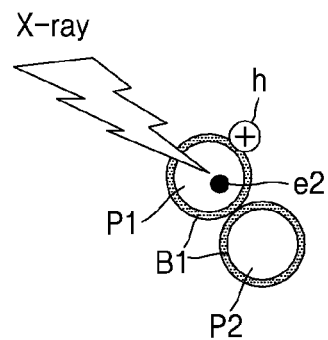
Figure 3D:
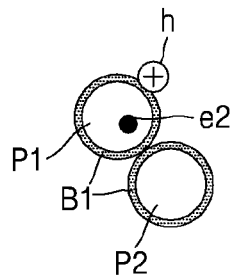

FIG. 3C shows an example where an electron e2 comes into the first photoconductive particle P1 by an additional irradiation of the X-ray. Since the hole h is trapped in the first photoconductive particle P1, the electron e2 of the first photoconductive particle P1 may not be moved to the second photoconductive particle P2 but may be in the first photoconductive particle P1. That is, as shown in FIG. 3D, the electron e2 of the first photoconductive particle P1 may not contribute to a photoconductive characteristic.

As described above, when a charge is trapped in a photoconductive particle or between the photoconductive particle and a binder, photoelectric conversion efficiency of a photoconductive layer may deteriorate. The problem described with reference to FIGS. 3A through 3D is an example of one of various problems due to trapped charges. Various other problems may occur. In particular, the charge trapped in the photoconductive particle or between the photoconductive particle and the binder may induce noise in a detection signal (an image signal) when radiation is detected. An amount of charges trapped in each region of the radiation detector may be different, and thus an influence of the trapped charges may be different according to regions.

Figure 4:
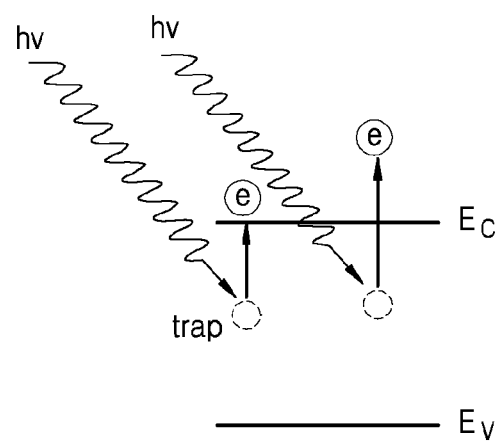
FIG. 4 is an energy band diagram of a process of exciting a charge trapped in a photoconductive particle of a radiation detector, according to an example embodiment.
Figure 4:

FIG. 4 is an energy band diagram of a process of exciting a charge trapped in a photoconductive particle of a radiation detector according to an example embodiment.

Referring to FIG. 4, reference numerals Ev and Ec respectively denote a valence band maximum energy level a conduction band minimum energy level of the photoconductive particle. When the photoconductive particle is HgI2, a bandgap Eg thereof may be about 2.1 eV, and a work function W thereof may be about 4.2 eV. An energy level of the charge trapped in the photoconductive particle may be within the bandgap of the photoconductive particle. According to an example embodiment, if the light L1 (of FIG. 1) having a desired, or alternatively predetermined energy is irradiated onto the photoconductive particle from the optical unit UT1 (of FIG. 1), a trapped electron may be excited to a conduction band. In FIG. 4, hv denotes a photon energy of the light L1 (of FIG. 1), wherein h denotes Planck's constant and v denotes a vibration number. A trapped electron $e_{trap}$ may be an excited electron e* after being excited by the photon energy hv. When the light L1 (of FIG. 1) includes ultraviolet rays, energy of the ultraviolet rays may be in the range of about 3.1~about 6.2 eV. When the light L1 (of FIG. 1) includes visible rays, the energy of the visible rays may be in the range of about 1.55 eV~about 3.1 eV. When the light L1 includes ultraviolet rays, since the ultraviolet rays may have high energy, the light L1 may more favorably act to remove the trapped electron. When the light L1 includes both ultraviolet rays and visible rays, removing efficiency of the trapped electron may be improved by using, for example, two types of light.

Meanwhile, although not shown in FIG. 4, a hole trapped in the photoconductive particle may be moved to a valence band by the photon energy hv. This means that the hole trapped in the photoconductive particle may be detrapped.

Figure 5:
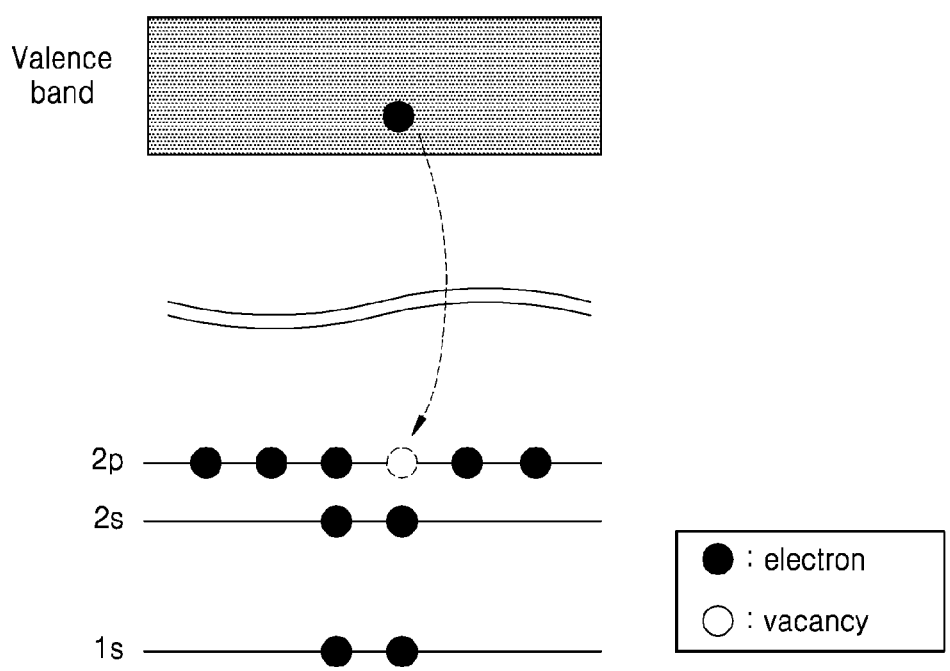
FIG. 5 is an energy band diagram of a process of recovering a vacancy of a core electron of a photoconductive particle of a radiation detector, according to an example embodiment.

FIG. 5 is an energy band diagram of a process of recovering a vacancy of a core electron of a photoconductive particle of a radiation detector, according to an example embodiment.

Referring to FIG. 5, reference numerals 1s, 2s, and 2p denote orbitals in which the core electron may be present. The vacancy of the core electron of the photoconductive particle may occur because of radiation. As a result, the photoconductive particle may have a positive (+) charge. In this case, when following radiation is applied, it may be difficult to transfer/generate an electron. The optical unit UT1 of FIG. 1 may recover the vacancy of the core electron of the photoconductive particle by using the light energy L1. In other words, as shown in FIG. 5, the optical unit UT1 may fill the vacancy of the core electron with an electron of a valence band, thereby improving photoelectric conversion efficiency of a photoconductive layer.

Figure 6:
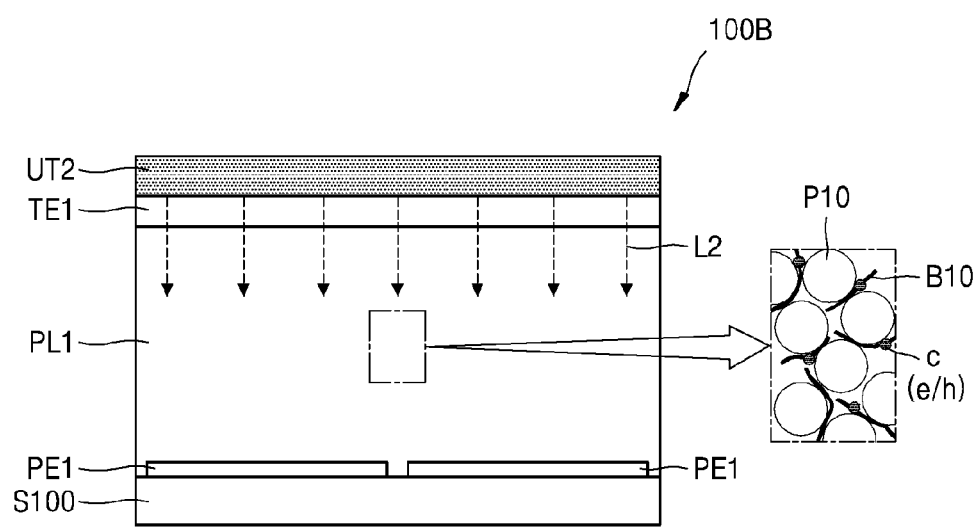
FIG. 6 is a cross-sectional view of a radiation detector, according to another example embodiment.

FIG. 6 is a cross-sectional view of a radiation detector 100B, according to another example embodiment.

Referring to FIG. 6, an optical unit UT2 may be on the counter electrode TE1. In this case, the counter electrode TE1 may be between the photoconductive layer PL1 and the optical unit UT2. The optical unit UT2 may have a similar or a same configuration to the configuration of the optical unit UT1 of FIG. 1. The optical unit UT1 of FIG. 1 is configured to irradiate the light L1 upward, whereas the optical unit UT2 of FIG. 6 is configured to irradiate light L12 downward. In other words, the light L1 of the optical unit UT1 of FIG. 1 is incident onto the photoconductive layer PL1 in the opposite direction to which radiation is incident onto the radiation detector 100A, the light L2 of the optical unit U2T of FIG. 6 is incident onto the photoconductive layer PL1 in the same direction as the radiation that is incident onto the radiation detector 100B. The optical unit UT1 of FIG. 1 and the optical unit UT2 of FIG. 6 may be the same in that the optical unit UT1 and the optical unit UT2 are configured to respectively irradiate the light L1 and the light L2 to the photoconductive layer PL1. A function of the optical unit UT2 of FIG. 6 may be substantially the same as the function of the optical unit UT1 of FIG. 1. That is, the optical unit UT2 may detrap or remove the charge c (electron and hole) trapped in an interface between the photoconductive particle P10 and the binder B10 by using the light L2. The optical unit UT2 may also detrap or remove a charge trapped in the photoconductive particle P10 by using the light L2. The light L2 may be the same as or similar to the light L1 of FIG. 1. The light L2 may include ultraviolet rays, visible rays, or both the ultraviolet rays and the visible rays, among other types of radiations.

The optical unit UT2 may have a transparent characteristic with respect to the radiation. Thus, the optical unit UT2 may not influence, or may hardly influence, a radiation penetration amount. The radiation that is irradiated from the optical unit UT2 to the photoconductive layer PL1 may be incident onto the photoconductive layer PL1 through the optical unit UT2.

Figure 7:
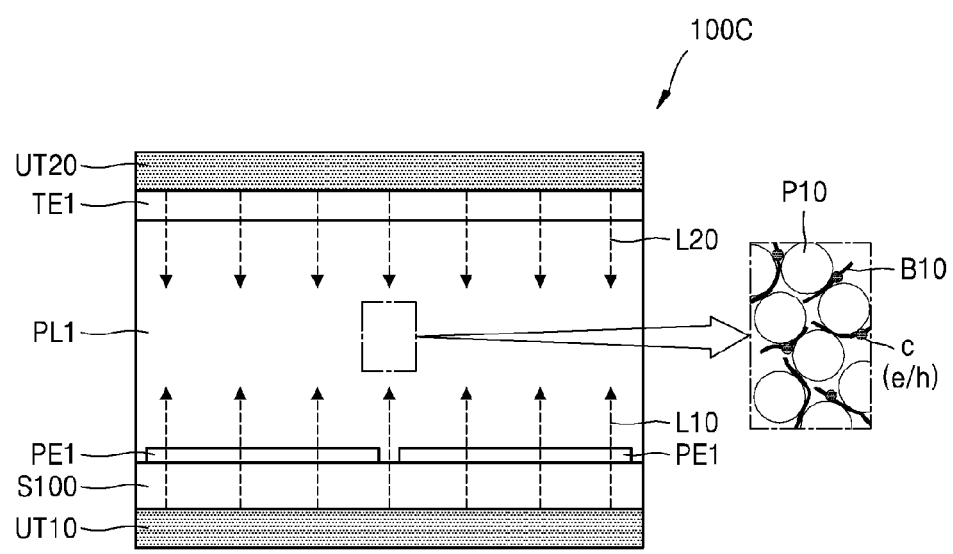
FIG. 7 is a cross-sectional view of a radiation detector, according to another example embodiment.

FIG. 7 is a cross-sectional view of a radiation detector 100C, according to another example embodiment.

Referring to FIG. 7, the radiation detector 100C of the example embodiment may include a plurality of optical units UT10 and UT20. The optical units UT10 and UT20 may include a first optical unit UT10 below an array substrate S100, and a second optical unit UT20 on the counter electrode TE1. The first optical unit UT10 and the optical unit UT1 of FIG. 1 may have a same or similar configuration, and may have substantially the same function. The second optical unit UT2 and the optical unit UT2 of FIG. 6 may have a same or similar configuration, and may have substantially the same function. The first optical unit UT10 may be configured to irradiate first light L10 to the photoconductive layer PL1. The second optical unit UT20 may be configured to irradiate second light L20 to the photoconductive layer PL1.

The first light L10 and the second light L20 may have a same or different wavelength range. The first light L10 may be one of ultraviolet rays and visible rays, for example, the ultraviolet rays. The second light L20 may be the other one, for example, the visible rays. As described above, different light is irradiated onto the photoconductive layer PL1 at both sides of the photoconductive layer PL1, thereby more efficiently detrapping a charge trapped in the photoconductive layer PL1. In particular, since a density of the trapped charge may be different according to a region (height) of the photoconductive layer PL1, when different lights are irradiated at both sides, the trapped charge may be more easily removed. However, the first light L10 and the second light L20 may include lights of the same wavelength. For example, both the first light L10 and the second light L20 may include ultraviolet rays. Alternatively, both the first light L10 and the second light L20 may include ultraviolet rays and visible rays.

Detailed structures of the optical units UT1, UT2, UT10, and UT20 used in the radiation detectors 100A, 100B, and 100C of FIGS. 1, 6, and 7 will now be described with reference to FIGS. 8 through 12 below.

Figure 8:
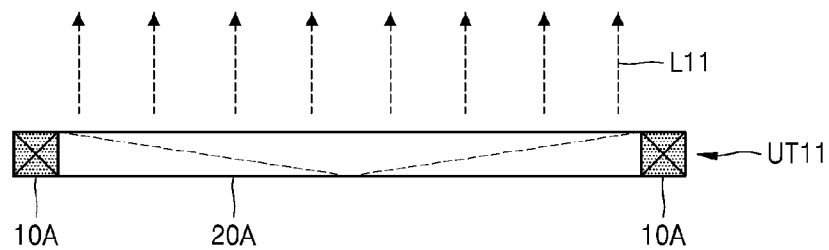
FIG. 8 is a cross-sectional view of an optical unit that may be used in a radiation detector, according to an example embodiment.

FIG. 8 is a cross-sectional view of an optical unit UT11 that may be used in a radiation detector, according to an example embodiment.

Referring to FIG. 8, the optical unit UT11 may include at least one ultraviolet light source 10A that generates ultraviolet rays. For example, two ultraviolet light sources 10A may be spaced apart from each other. The optical unit UT11 may include an optical waveguide 20A configured to guide ultraviolet rays generated from the ultraviolet light sources 10A to a photoconductive layer (e.g. PL1 of FIG. 1). The optical waveguide 20A may be between the two ultraviolet light sources 10A. The ultraviolet light sources 10A may be at both ends of the optical waveguide 20A. The ultraviolet rays generated by the ultraviolet light sources 10A may be emitted to one side of the optical unit UT11, for example, an upper side, through the optical waveguide 20A. L11 denotes the ultraviolet rays emitted from the optical unit UT11.

Figure 9:
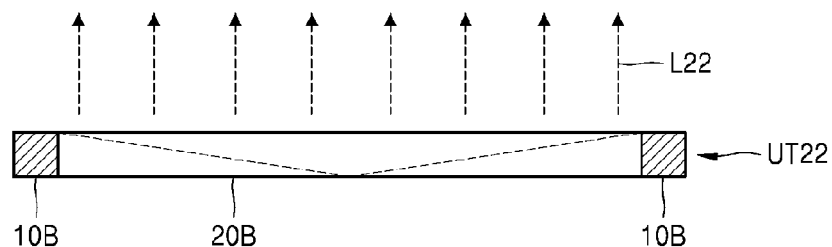
FIG. 9 is a cross-sectional view of an optical unit that may be used in a radiation detector, according to an example embodiment.

FIG. 9 is a cross-sectional view of an optical unit UT22 that may be used in a radiation detector, according to an example embodiment.

Referring to FIG. 9, the optical unit UT22 may include at least one visible light source 10B that generates visible rays. For example, two visible light source 10B may be spaced apart from each other. The visible light sources 10B may include, for example, a light emitting device (LED). That is, the visible light sources 10B may be an LED light source. The LED light source may have high efficiency and high performance, and an excellent switching characteristic. The optical unit UT22 may further include an optical waveguide 20B that guides visible rays generated from the visible light sources 10B to a photoconductive layer (e.g. PL1 of FIG. 1). The visible light sources 10B may be at both ends of the optical waveguide 20B. The visible rays generated by the visible light sources 10B may be emitted to one side of the optical unit UT22, for example, an upper side, through the optical waveguide 20B. L22 denotes the visible rays emitted from the optical unit UT22.

Figure 10:
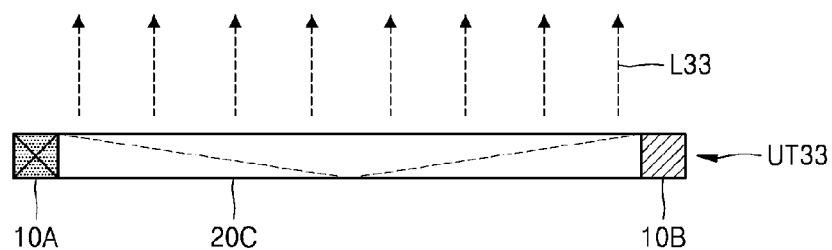
FIG. 10 is a cross-sectional view of an optical unit that may be used in a radiation detector, according to an example embodiment.

FIG. 10 is a cross-sectional view of an optical unit UT33 that may be used in a radiation detector, according to an example embodiment.

Referring to FIG. 10, the optical unit UT33 may include the ultraviolet light sources 10A and the visible light sources 10B that are spaced apart from each other. The optical unit UT33 may include an optical waveguide 20C between the ultraviolet light sources 10A and the visible light sources 10B. The ultraviolet light sources 10A is on one side of the optical waveguide 20C and the visible light sources 10B is on the other side of the optical waveguide 20C. Ultraviolet rays generated by the ultraviolet light sources 10A may be emitted to one side of the optical unit UT33 through the optical waveguide 20C. Visible rays generated by the visible light sources 10B may be emitted to one side of the optical unit UT33 through the optical waveguide 20C. For example, the ultraviolet rays and the visible rays may be emitted to an upper side of the optical unit UT33. L33 denotes the ultraviolet rays and the visible rays emitted from the optical unit UT33.

Figure 11:
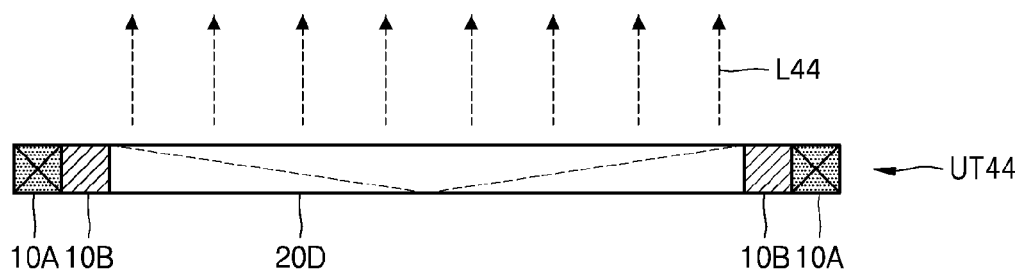
FIG. 11 is a cross-sectional view of an optical unit that may be used in a radiation detector, according to an example embodiment.

FIG. 11 is a cross-sectional view of an optical unit UT44 that may be used in a radiation detector, according to an example embodiment.

Referring to FIG. 11, the optical unit UT44 may include an optical waveguide 20D and the pair of light sources 10A and 10B provided at both sides of the optical waveguide 20D. The ultraviolet and visible light sources 10A and 10B may be provided at one side of the optical waveguide 20D. The ultraviolet and visible light sources 10A and 10B may also be provided at the other side of the optical waveguide 20D. The optical waveguide 20D may be between the two ultraviolet light sources 10A. The visible light sources 10B may be between each of the two ultraviolet light sources 10A and the optical waveguide 20D. Locations of the light sources 10A and the visible light sources 10B may be switched in at least one side of the optical waveguide 20D. In a structure of FIG. 11, both ultraviolet rays and visible rays may be irradiated onto the optical waveguide 20D from one side of the optical waveguide 20D and from the other side thereof. L44 denotes the ultraviolet rays and the visible rays emitted from the optical unit UT44.

Figure 12:
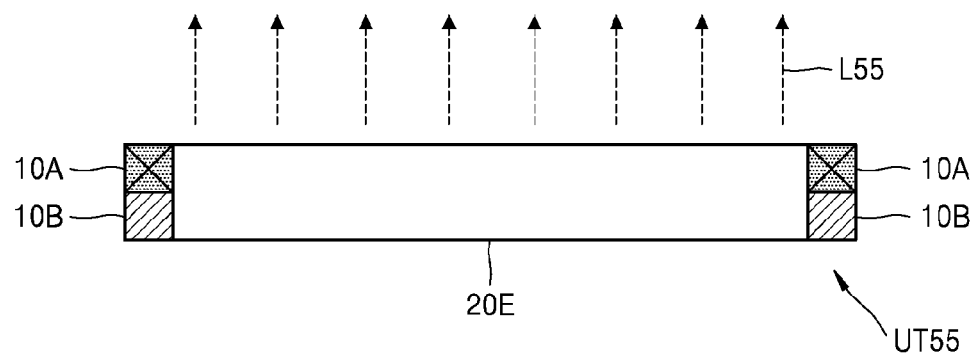
FIG. 12 is a cross-sectional view of an optical unit that may be used in a radiation detector, according to an example embodiment.

FIG. 12 is a cross-sectional view of an optical unit UT55 that may be used in a radiation detector, according to an example embodiment.

Referring to FIG. 12, the optical unit UT55 may include an optical waveguide 20E and the pair of light sources 10A and 10B provided at both sides of the optical waveguide 20E. The ultraviolet and visible light sources 10A and 10B may be provided at one side of the optical waveguide 20E. The ultraviolet and visible light sources 10A and 10B may also be provided at the other side of the optical waveguide 20E. The ultraviolet and visible light sources 10A and 10B may be in parallel at one side of the optical waveguide 20E. The ultraviolet and visible light sources 10A and 10B may also be in parallel at the other side of the optical waveguide 20E. Both ultraviolet rays and visible rays may be irradiated onto the optical waveguide 20E from one side of the optical waveguide 20E and from the other side thereof. L55 denotes the ultraviolet rays and the visible rays emitted from the optical unit UT55. Locations of the light sources 10A and the visible light sources 10B may be switched in at least one side of the optical waveguide 20E.

The structures of the optical units UT11, UT22, UT33, UT44, and UT55 described with reference to FIGS. 8 through 12 above may apply to the optical units UT1, UT, UT10, and UT20 of the radiation detectors 100A, 100B, and 100C of FIGS. 1, 6, and 7. When one of the optical units UT11, UT22, UT33, UT44, and UT55 described with reference to FIGS. 8 through 12 is on the counter electrode TE1 like the optical unit UT2 of FIG. 6 and the second optical unit UT20 of FIG. 7, the optical units UT11, UT22, UT33, UT44, and UT55 may be upside down on the counter electrode TE1. Thus, when the optical units UT11, UT22, UT33, UT44, and UT55 are present on the counter electrode TE1, the light L11, L22, L33, L44, and L55 of the optical units UT11, UT22, UT33, UT44, and UT55 may be emitted downward and irradiated onto the photoconductive layer PL1.

Figure 13:
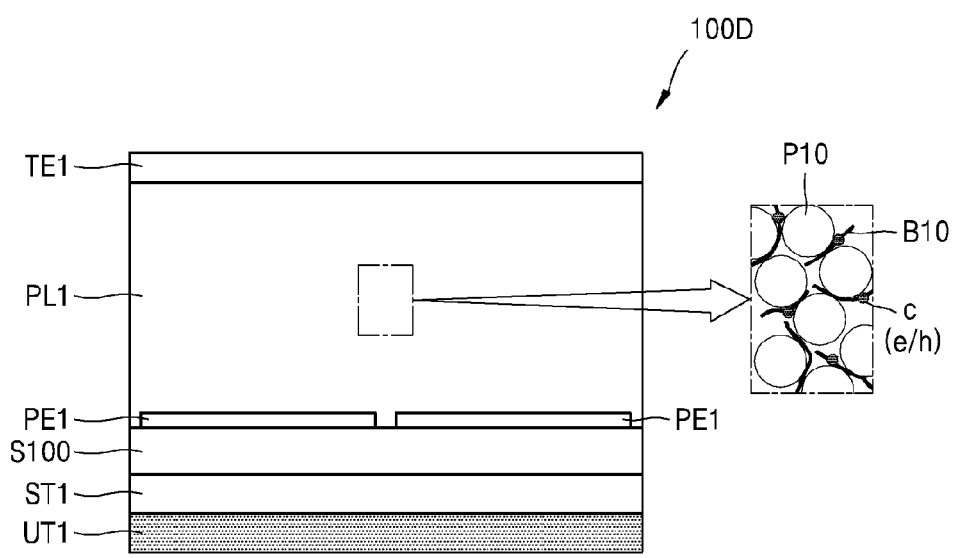
FIG. 13 is a cross-sectional view of a radiation detector according to another example embodiment.

FIG. 13 is a cross-sectional view of a radiation detector 100D, according to another example embodiment.

Referring to FIG. 13, the radiation detector 100D may further include a light shutter ST1. The light shutter ST1 may be adjacent to the optical unit UT1. For example, the light shutter ST1 may be between the array substrate S100 and the optical unit UT1. In this regard, the optical unit UT1 may be a device configured to irradiate light (not shown) including ultraviolet rays to the photoconductive layer PL1. That is, the optical unit UT1 may include an ultraviolet light source. When the optical unit UT1 includes the ultraviolet light source, the optical unit UT1 may adjust an amount of the light (including the ultraviolet rays) (not shown) irradiated from the optical unit UT1 to the photoconductive layer PL1 by using the light shutter ST1. The light shutter ST1 may be used to turn on/off the light irradiated from the optical unit UT1 to the photoconductive layer PL1. Thus, the light shutter ST1 may be used to easily adjust a process of irradiating (i.e., initializing) the light onto the photoconductive layer PL1 in various ways.

Figure 14:
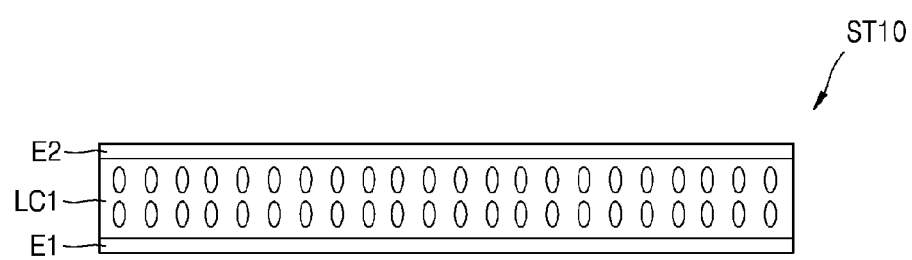
FIG. 14 shows an example of a structure of a light shutter of FIG. 13.

The light shutter ST1 of FIG. 13 may have a structure as shown in, for example, FIG. 14. That is, FIG. 14 shows an example of a structure of the light shutter ST1 of FIG. 13.

Referring to FIG. 14, a light shutter ST10 may include a liquid crystal layer LC1. The light shutter ST10 may include a first electrode layer E1 on a lower surface of the liquid crystal layer LC1 and a second electrode layer E2 on an upper surface of the liquid crystal layer LC1. A liquid crystal alignment status of the liquid crystal layer LC1 may be changed by adjusting a voltage applied between the first electrode layer E1 and the second electrode layer E2. Thus, an amount of light that passes through the light shutter ST10 may be adjusted. The structure of the light shutter ST10 of FIG. 14 is merely an example and may vary.

Figure 15:
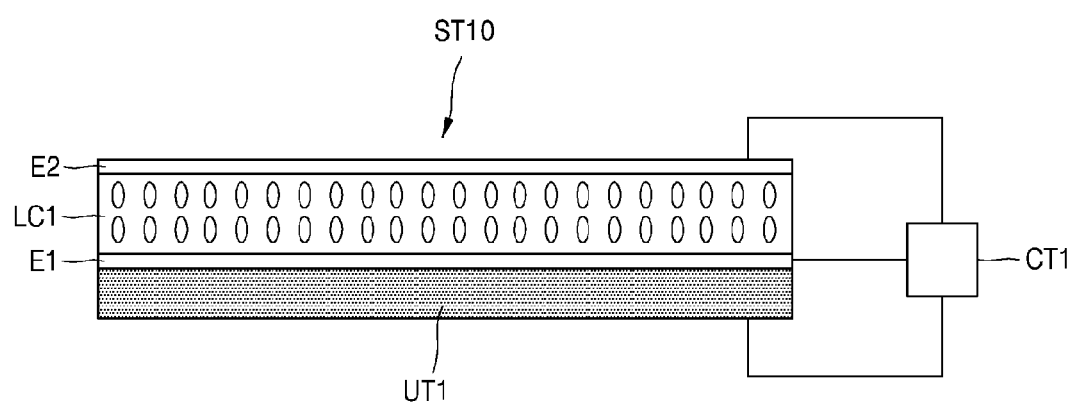
FIG. 15 is a cross-sectional view of an example of a light shutter and an optical unit for explaining a layout and a connection thereof.

FIG. 15 is a cross-sectional view of an example of the light shutter ST10 and the optical unit UT1 for explaining a layout and a connection thereof.

Referring to FIG. 15, the light shutter ST10 may be provided on the optical unit UT1. A controller CT1 electrically connected to the light shutter ST10 and the optical unit UT1 may be further provided. The controller CT1 may be connected to the first electrode layer E1 and the second electrode layer E2 of the light shutter ST10 and may be connected to the optical unit UT1. The controller UT1 may be used to control operations of the light shutter ST10 and the optical unit UT1. However, the layout and the connection of FIG. 15 are examples and may vary.

Figure 16:
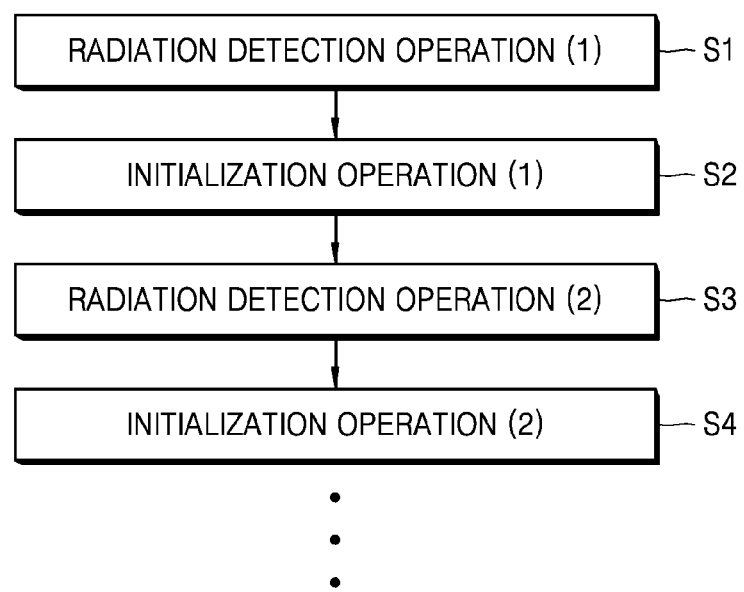
FIG. 16 is a flowchart of a method of operating a radiation detector according to an example embodiment.

FIG. 16 is a flowchart of a method of operating a radiation detector, according to an example embodiment.

Referring to FIG. 16, a "radiation detection operation (1)" that detects radiation that transmits a subject by using the radiation detector may be performed (operation S1). Then, an "initialization operation (1)" that detraps/removes a charge or charges trapped in a photoconductive layer in the "radiation detection operation (1)" may be performed (operation S2). In this regard, a charge trapped between a photoconductive particle constituting the photoconductive layer and a binder may be detrapped/removed, and the charge trapped in the photoconductive layer may be detrapped/removed. Thereafter, the "radiation detection operation (2)" may be performed (operation S3), and then the "initialization operation (2)" may be performed (operation S4). That is, the radiation detection operation and the initialization operation may be alternatively and repeatedly performed.

Figure 17:
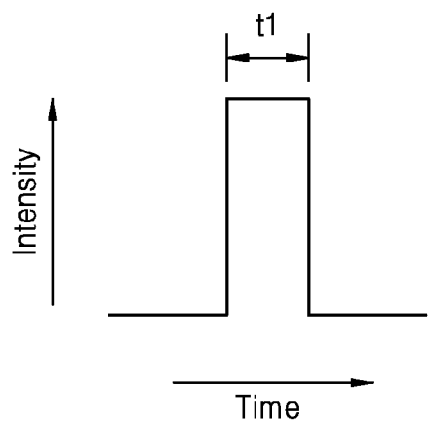
FIG. 17 is a diagram of an example of a variation of an intensity of light (light energy) used in an operation of initializing a photoconductive layer with respect to time, according to an example embodiment.

FIG. 17 is a diagram of an example of a variation of an intensity of light (light energy) used in an operation of initializing a photoconductive layer with respect to time, according to an example embodiment. FIG. 17 shows an example of a waveform of the light (light energy).

Referring to FIG. 17, the waveform of the light (light energy) used in the operation of initializing the photoconductive layer may be in the form of a pulse. A time t1 for applying the light (light energy) in the form of the pulse may be more than about 50 ms (millisecond) or 100 ms.

Figure 18:
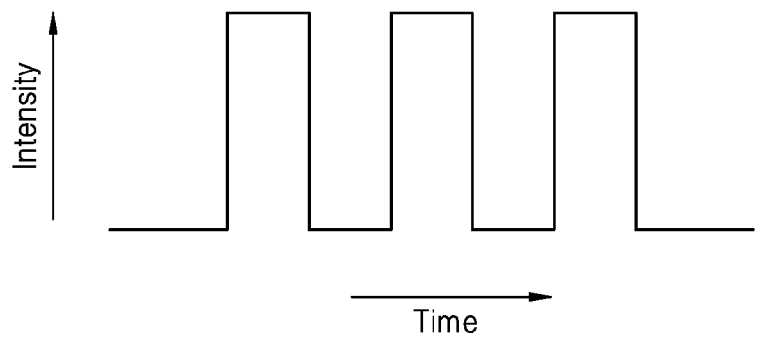
FIG. 18 is a diagram of an example of a variation of an intensity of light (light energy) used in an operation of initializing a photoconductive layer with respect to time, according to another example embodiment.

Although a pulse light may be used one time while initializing the photoconductive layer, the pulse light may be used several times according to necessity, of which example is shown in FIG. 18. Referring to FIG. 18, the light in the form of the pulse may be applied several times at a desired, or alternatively predetermined distance. That is, the operation of initializing the photoconductive layer may be performed by turning on/off the light. For example, the light shutters ST1 and ST10 of FIGS. 13 through 15 may be used to irradiate and block the light, i.e., control to turn on/off the light, with respect to the photoconductive layer.

However, the variation (i.e. the waveform) of the intensity of the light (light energy) described with reference to FIGS. 17 and 18 is an example, and may vary. For example, an intensity of a pulse light may vary by not applying the pulse light having the same intensity of FIG. 18 several times.

Figure 19:
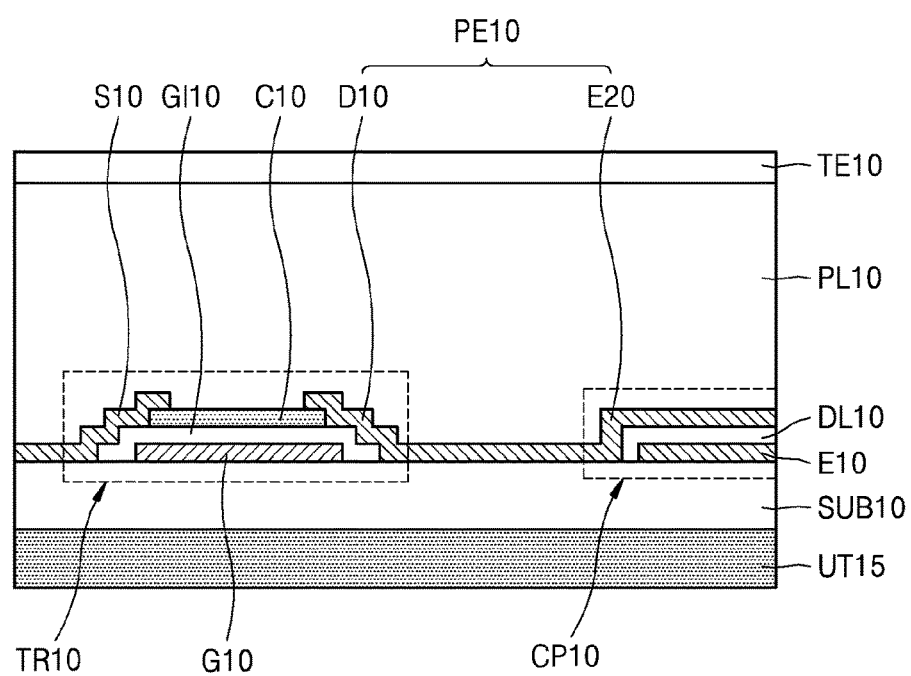
FIG. 19 is a cross-sectional view of an example of a detailed structure of a radiation detector, according to an example embodiment.

FIG. 19 is a cross-sectional view of an example of a detailed structure of a radiation detector, according to an example embodiment. A structure of the array substrate S100 of FIG. 1 will now be described in more detail with reference to FIG. 19 below.

Referring to FIG. 19, a thin film transistor (TFT) device TR10 and a capacitor CP10 may be provided on a substrate SUB10. The TFT device TR10 may include a gate electrode G10, a gate insulating layer GI10, a channel layer C10, a source electrode S10, and a drain electrode D10. The capacitor CP10 may include a first electrode E10, a dielectric layer DL10, and a second electrode E20. The drain electrode D10 of the TFT device TR10 may be connected to the second electrode E20 of the capacitor CP10. The drain electrode D10 and the second electrode E20 may configure the single pixel electrode PE10. Although not shown, data line connected to the source electrode S10 may be further provided. The photoconductive layer (photoelectric conversion layer) PL10 that covers the TFT device TR10 and the capacitor CP10 may be provided. The counter electrode TE10 may also be on the photoconductive layer PL10. An electron-hole pair generated in the photoconductive layer PL10 by radiation may be stored in the capacitor CP10 by an electric field applied between the counter electrode TE10 and the pixel electrode PE10, and may be read as an electrical signal according to an operation of the TFT device TR10. In FIG. 19, the substrate SUB10 including the pixel electrode PE10 may be an example of the array substrate S100 of FIG. 1. The plurality of pixel electrodes PE10 may be provided on the substrate SUB10. The plurality of TFT devices TR10 that are respectively connected to the plurality of pixel electrodes PE10 may be provided on the substrate SUB10. An optical unit UT15 may be provided on a lower surface of the substrate SUB10. The optical unit UT15 may be substantially the same as the optical unit UT1 of FIG. 1. That is, the optical unit UT15 may provide light energy for detrapping or removing a charge trapped in the photoconductive layer PL10 to the photoconductive layer PL10. The optical unit UT15 may be provided on an upper surface of the counter electrode TE10 other than the lower surface of the substrate SUB10. A second optical unit (not shown) may be provided on the counter electrode TE10 in a status where the optical unit UT15 is provided on the lower surface of the substrate SUB10.

Although not shown in FIG. 19, a desired, or alternatively predetermined readout circuit connected to the TFT device TR10 may be further provided. A structure of the readout circuit is well known, and thus a detailed description thereof is omitted. The structure of FIG. 19 is merely an example of the detailed structure of the radiation detector, and may vary.

Figure 20:
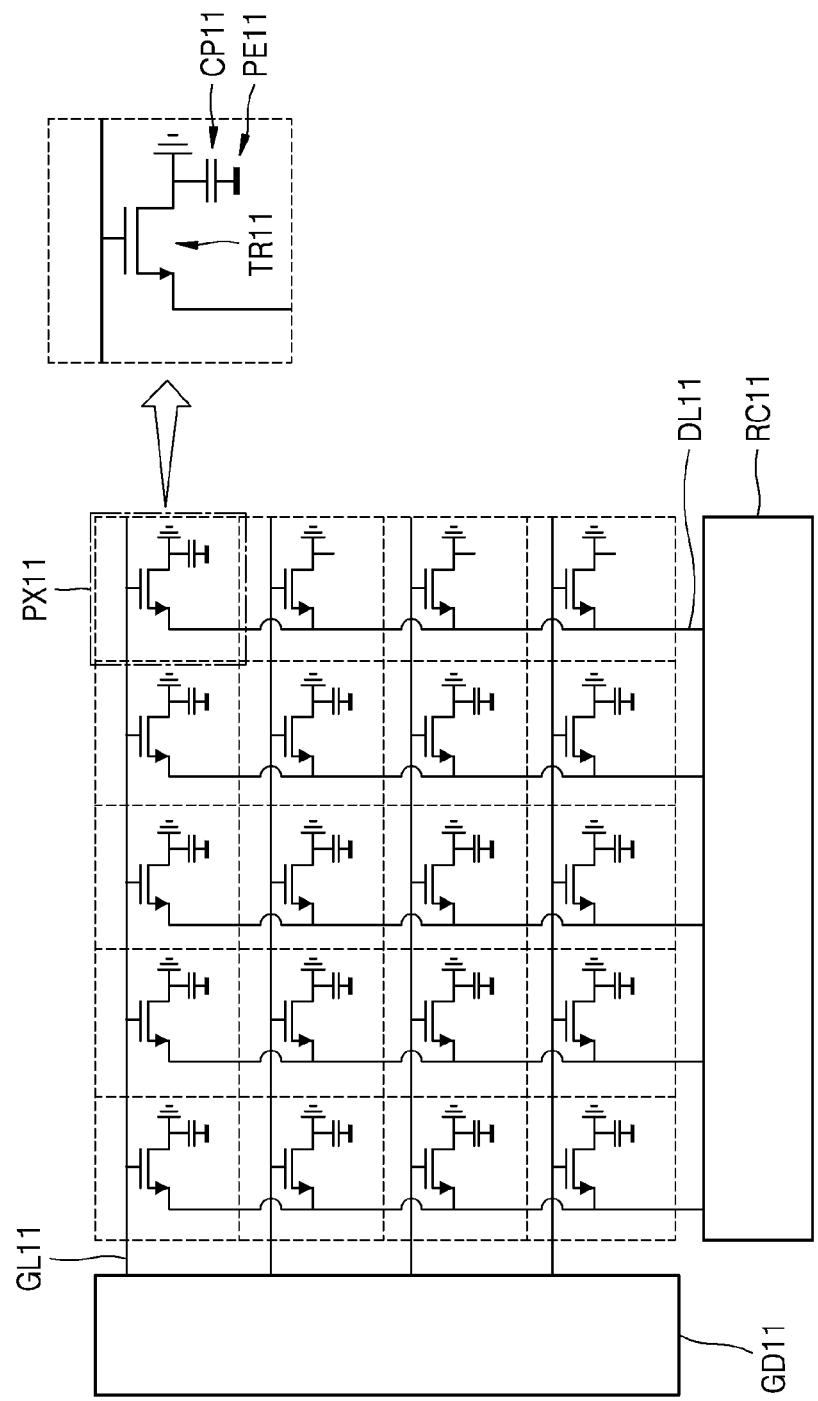
FIG. 20 is a circuit diagram of an example of a circuit structure of a radiation detector, according to an example embodiment.

FIG. 20 is a circuit diagram of an example of a circuit structure of a radiation detector, according to an example embodiment.

Referring to FIG. 20, a plurality of gate lines GL11 extending in a first direction may be spaced apart from each other by a desired, or alternatively predetermined gap. A plurality of data lines DL11 crossing the plurality of gate lines GL11 may be provided. A TFT device TR11 may be provided in each of crossing points of the plurality of gate lines GL11 and the plurality of data lines DL11. A capacitor CP11 connected to each of the TFT devices TR11 may be provided. A pixel electrode PE11 connected to each of the capacitors CP11 may be provided. The TFT device TR11, the capacitor CP11 connected thereto, and the pixel electrode PE11 may configure a pixel region PX11. A plurality of pixel regions PX11 may be aligned to form a plurality of columns and rows. Each of the pixel regions PX11 may include the TFT device TR11, the capacitor CP11 connected thereto, and the pixel electrode PE11.

A gate driver GD11 connected to the plurality of gate lines GL11 may be provided. A readout circuit RC11 connected to the plurality of data lines DL11 may be provided. Detailed structures of the gate driver GD11 and the readout circuit RC11 are well known, and thus detailed descriptions thereof are excluded. S The radiation detectors according to the example embodiments described above may be, for example, X-ray detectors and gamma (γ)-ray detectors.

Figure 21:
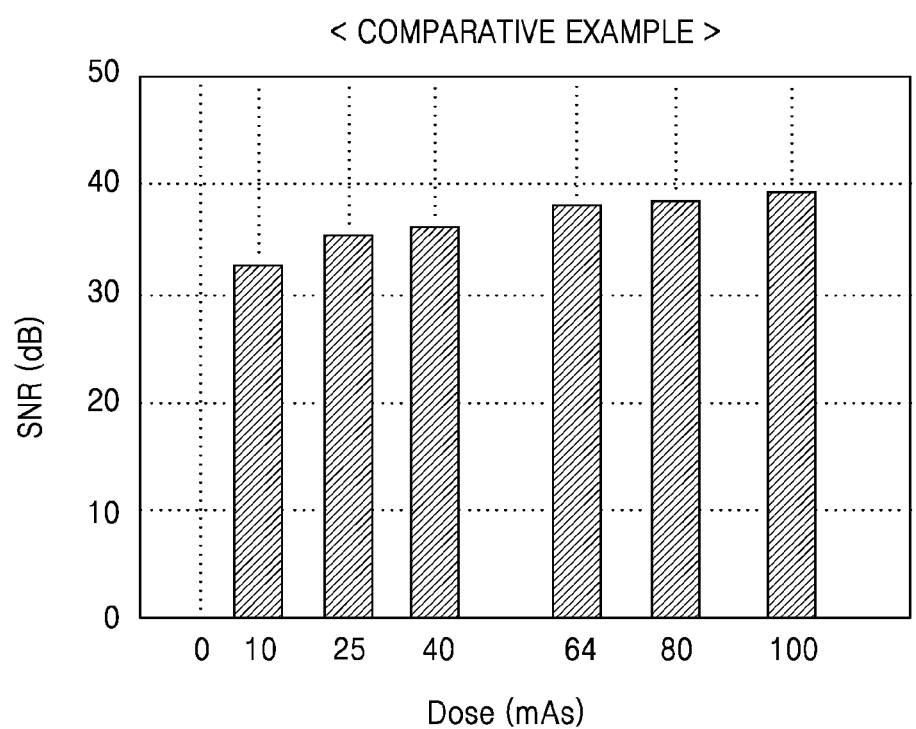
FIG. 21 is a graph of a signal-to-ratio (SNR) with respect to a radiation dose of a radiation detector according to a comparative example.

FIG. 21 is a graph of a signal-to-ratio (SNR) with respect to a radiation dose of a radiation detector, according to a comparative example. The radiation detector according to the comparative example does not include an "optical unit" according to an example embodiment. The radiation detector according to the comparative example may be a general X-ray detector. S Referring to FIG. 21, the radiation detector according to the comparative example has the SNR below 40 dB (decibel) within a measurement range. When the radiation (X-ray) dose is 80 mAs (milliampere-second), the SNR is about 38.2 dB. When the radiation is detected by not detrapping/removing a charge trapped in a photoconductive layer, a relatively low SNR may be measured.

Figure 22:
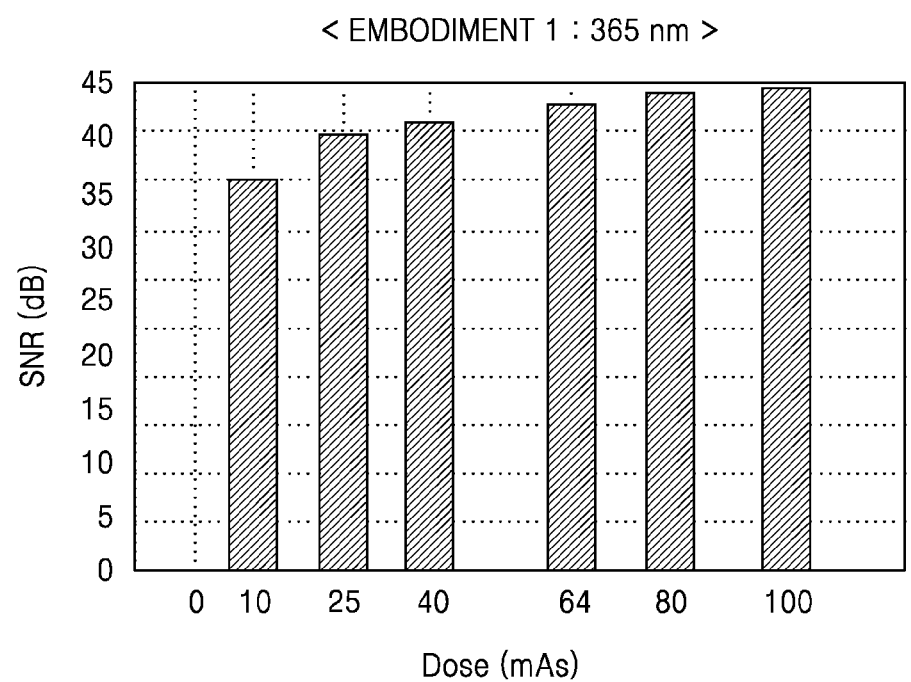
FIGS. 22 and 23 are graphs of an SNR with respect to a radiation dose of a radiation detector, according to example embodiments.
Figure 23:
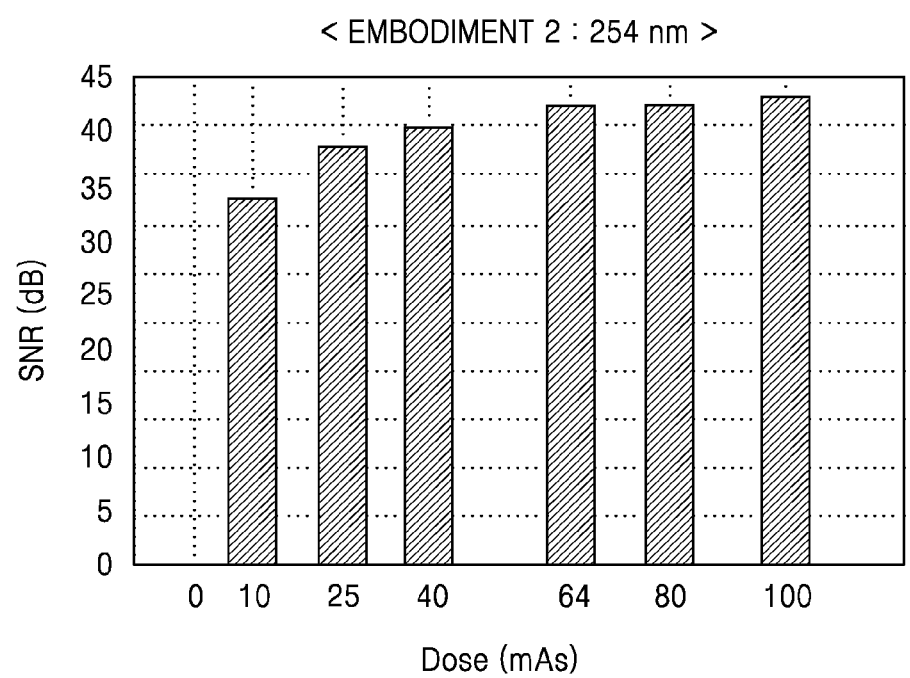

FIGS. 22 and 23 are graphs of an SNR with respect to a radiation dose of a radiation detector according to example embodiments. The radiation detector according to example embodiments has the structure of FIG. 6. The graph of FIG. 22 shows the SNR measured by irradiating light (ultraviolet rays) having a wavelength of 365 nm onto the photoconductive layer PL1 from the radiation detector 100B to the optical unit UT2 and performing an initialization operation. The graph of FIG. 23 shows the SNR measured by irradiating light (ultraviolet rays) having a wavelength of 254 nm onto the photoconductive layer PL1 from the radiation detector 100B to the optical unit UT2 and performing an initialization operation.

Referring to FIGS. 22 and 23, the graphs show an increase in the SNR compared to the SNR according to the comparative example of FIG. 21. When the radiation (X-ray) dose is 80 mAs in the example embodiment of FIG. 22, the SNR is about 44 dB. When the radiation (X-ray) dose is 80 mAs in the example embodiment of FIG. 23, the SNR is about 42.2 dB. These numerical values mean an increase of about 15% compared to that of FIG. 21. Therefore, when light energy is used to detrap/remove the charge trapped in the photoconductive layer according to the example embodiment, noise may be reduced, and a detection sensitivity may be improved.

It should be understood that the example embodiments described therein should be considered in a descriptive sense only and not for purposes of limitation. Descriptions of features within each example embodiment should typically be considered as available for other similar or same features in other example embodiments. For example, it will be understood by those of ordinary skill in the art that the structures of the radiation detectors described with reference to FIGS. 1, 6-15, 19, and 20 may be modified in various ways. By way of example, it will be understood by those of ordinary skill in the art that a complementary metal-oxide semiconductor (CMOS) device or a charge-coupled device (CCD) device may be used as a unit circuit connected to a pixel electrode, instead of or in combination of a TFT device. It also will be understood by those of ordinary skill in the art that the example methods of operating the radiation detectors described with reference to FIGS. 2A through 2D and 16 through 18 may be modified in various ways.

While one or more example embodiments have been described with reference to the figures, it will be understood by those of ordinary skill in the art that various changes in form and details may be made therein without departing from the spirit and scope defined by the following claims.

What is claimed is:

1. A radiation detector comprising:
   an array substrate including a plurality of pixel electrodes;
   a counter electrode facing the array substrate;
   a photoconductive layer between the array substrate and the counter electrode and having a particle-in-binder (PIB) structure in which a photoconductive particle and a binder are mixed; and
   an optical unit configured to provide light energy to the photoconductive layer to detrap a charge trapped in an interface between the photoconductive particle and the binder; and
   a light shutter comprising a liquid crystal layer configured to control an amount of light energy irradiated onto the photoconductive layer,
   wherein the light energy comprises light having a wavelength in a range of 200 nm~400 nm.

2. The radiation detector of claim 1, wherein the light energy comprises at least one of ultraviolet rays and visible rays.

3. The radiation detector of claim 1, wherein the optical unit comprises:
   an ultraviolet light source configured to generate ultraviolet rays as the light energy; and
   an optical waveguide configured to guide the ultraviolet rays generated by the ultraviolet light source to the photoconductive layer.

4. The radiation detector of claim 1, wherein the optical unit comprises:
   a visible light source configured to generate visible rays as the light energy; and
   an optical waveguide configured to guide the visible rays generated by the visible light source to the photoconductive layer.

5. The radiation detector of claim 4, wherein the visible light source comprises a light emitting diode (LED).

6. The radiation detector of claim 1, wherein the optical unit is configured to detrap at least one of charges trapped in the photoconductive particle by using the light energy.

7. The radiation detector of claim 1, wherein the photoconductive particle comprises at least one of $HgI_2$, $PbI_2$, PbO, TlBr, CdTe, CdZnTe, CdS, $BiI_3$ and mixtures thereof.

8. The radiation detector of claim 7, wherein the photoconductive particle comprises $HgI_2$.

9. The radiation detector of claim 1, wherein the binder comprises at least one of a polyvinyl butyral based material, an acryl based material, a polyester based material, a phenoxy based material, a polyvinyl formal based material, a polyamide based material, a polystyrene based material, a polycarbonate based material, a polyvinyl acetate based material, a polyurethane based material, an epoxy based material and mixtures thereof.

10. The radiation detector of claim 1, wherein the optical unit is on a lower surface of the array substrate, wherein the array substrate is between the optical unit and the photoconductive layer.

11. The radiation detector of claim 1, wherein the optical unit is on the counter electrode, wherein the counter electrode is between the optical unit and the photoconductive layer.

12. The radiation detector of claim 1, wherein the photoconductive layer has a thickness in a range of about 100~about 250 µm.

13. The radiation detector of claim 1, wherein the array substrate comprises a plurality of thin film transistor (TFT) devices respectively connected to the plurality of pixel electrodes.

14. The radiation detector of claim 1, wherein the radiation detector is an X-ray detector or a gamma (γ)-ray detector.

15. A method of operating a radiation detector having a photoconductive layer having a particle-in-binder (PIB) structure in which a photoconductive particle and a binder are mixed, the method comprising:
    detecting radiation by using the radiation detector; and
    providing light energy to the photoconductive layer to detrap a charge trapped in an interface between the photoconductive particle and the binder when the radiation is detected; and
    controlling, by a light shutter comprising a liquid crystal layer, an amount of light energy irradiated onto the photoconductive layer,
    wherein the light energy comprises light having a wavelength in a range of 200 nm~400 nm.

16. The method of claim 15, further comprising controlling an amount of the light energy provided to the photoconductive layer by using a light shutter included in the radiation detector.

17. The method of claim 15, wherein the providing of the light energy to the photoconductive layer comprises detrapping at least one of charges trapped in the photoconductive particle by using the light energy.

18. The method of claim 15, wherein the photoconductive layer is between two electrodes, the method further comprising providing the light energy to the photoconductive layer when no voltage is applied to the two electrodes.

19. The method of claim 15, wherein the light energy is incident onto the photoconductive layer in the opposite direction to which the radiation is incident onto the radiation detector.

20. The method of claim 15, wherein the light energy is incident onto the photoconductive layer in the same direction as which the radiation is incident onto the radiation detector.

21. A method of detrapping charges trapped in a radiation detector, comprising:
    irradiating a photoconductor including a particle-in-binder (PIB) structure with a first radiation, the first radiation creating electron/hole pairs, one or more of the electron/hole pairs being trapped in an interface between a photoconductive particle and a binder; and
    irradiating the photoconductor with a second radiation, the second radiation substantially detrapping the one or more electron/hole pairs.

22. The method of claim 21, wherein at least one of:
    the first radiation comprises x-ray radiation; and
    the second radiation comprises one of ultraviolet radiation and visible radiation.

23. The method of claim 21, wherein the particle-in-binder (PM) structure comprises a binder including at least one of a polyvinyl butyral based material, an acryl based material, a polyester based material, a phenoxy based material, a polyvinyl formal based material, a polyamide based material, a polystyrene based material, a polycarbonate based material, a polyvinyl acetate based material, a polyurethane based material, an epoxy based material, and mixtures thereof.

24. The method of claim 21, wherein the first radiation is irradiated from a first direction and the second radiation is irradiated from a second direction, the first direction being opposite to the second direction.

\* \* \* \* \*